Patented Jan. 14, 1941

2,228,539

UNITED STATES PATENT OFFICE 2,228,539

ARTIFICIAL STONE

Harold M. Stark, Highland Park, Mich.

No Drawing. Application February 21, 1938,
Serial No. 191,729

2 Claims. (Cl. 106—24)

The present invention relates to the production of artificial stone or concrete, or composite materials useful for the present purposes of concrete and for many other purposes for which the present known concrete is not generally considered practicable.

Among the objects of the present invention is to lessen the cost of such products by permitting the use of aggregating materials usually obtainable at the place of production or within easy reach. This feature alone tends to reduce the cost of the finished products, in reducing transportation costs for sand, gravel, etc.

Another object is a process of the kind indicated in which is becomes possible to use as aggregate material, such materials as flat sand, ashes, loam, crushed clay and many other materials heretofore rejected as being entirely unsuitable.

A further object is the treatment of such aggregate materials so that the use of cement is minimized to the point where it serves chiefly as a hygroscopic filler.

Another object is to use finely divided clays, lava, carbonates, cements, etc. to fill minute voids and at the same time serve as a means to retain solutions uniformly throughout the mix until their reactions take place, so as to assure more homogeneous and denser products, and products having greater resistance to water and acid.

Still other objects and advantages will readily appear to those skilled in the art upon reference to the following description:

Heretofore, in preparing aggregates for the making of concrete, it has been necessary to attain a considerable degree of cleanness in both fine and coarse materials, to assure the proper consistency and strength of the finished product. With fairly clean but unwashed aggregate, it has been common practice to increase the cement content usually to 1 part cement to 3 parts sand and sometimes more, thereby increasing cost.

It has been found, however, that by treating the mix with certain chemicals, it is possible to reduce the cement-to-aggregate ratio to 1 to 8 and lower, to the point where it functions chiefly as an inexpensive, amorphous filler and reactive desiccator.

The preferred materials to be added to the mix are selected for commercial and other reasons from the nitrates, sulphates, phosphates and acid phosphates, acetates, chlorates and perchlorates, of certain of the heavy materials, such as copper and iron, and the compounds of sodium, potassium and ammonium. Suitable portions of the desired constituents are chosen according to aggregates available and type of finished product desired. An example of a suitable selection of materials and their proportions is as follows:

| | Parts by weight |
|---|---|
| Copper sulphate | 11 |
| Ammonium sulphate | 20 |
| Ammonium alum | 4 |
| Potassium nitrate | 15 |
| Suitable filler | 60 |

These materials are well mixed and added to the cement aggregate, and water mixture so as to have two to six pounds of the chemical mixture for each 100 pounds or sack of cement. In making the addition, the mixed chemicals may be ground dry and added in suitable amounts to the cement at the time of packaging the latter, or it may be added to the dry mix before adding water, or the proper amount for a single mix may be dissolved in some or all of the water used in making the concrete mix.

Oxalic, formic and other organic acids may be added in small quantity to give a smoother texture in certain products. Alumina also makes for a better bond in the finished products.

While specific proportions and formula have been stated, these are not critical and may be varied considerably, depending upon the aggregate being used and the properties desired for the finished product. For example, copper sulphate is desirable and should be used when there is much dirt, organic material or organic acids present in the aggregate material, but it tends to increase the time of setting. The potassium nitrate added seems to exert an oxidizing action and to improve the finished material when used with copper sulphate and without the other materials, though the setting time is not decreased.

A suitable range of proportions of the several substances mentioned in the specific example will be as follows:

| | Parts by weight |
|---|---|
| Copper sulphate | 8 to 25 |
| Alum | 3 to 7 |
| Ammonium sulphate | 6 to 20 |
| Potassium nitrate | 10 to 20 |
| Filler | 50 to 70 |

The filler may be any inert and non-deleterious material such as ground shell or other form of calcium carbonate, powdered sulphur, cement, or other silicious material.

It should be noted that concrete mixtures now standardized can be noticeably strengthened and made more water and acid resistant by the addition of a mixture of the chemicals mentioned above.

The alums and the other sulphates are added for the coagulating effect and to offset the set-retarding effect of the copper salt, and in doing so, greatly improve the finished product.

As stated above, these materials may be varied in proportions to a considerable degree, and other oxidizing salts and other ammonium salts, such as the chlorate, may be used. If, however, they are to be mixed with dry cement at the mill, or if the dry mixture is to be allowed to stand, such salts must be non-hygroscopic so as to avoid attraction of moisture to the dry material.

The several materials indicated in the above formula exert effects not clearly understood. The heavy metal sulphates, however, seem to act as scavengers to eliminate the bad effects of any organic substances in the aggregate materials as does also the potassium nitrate, the latter, in the presence of the other materials, also acts as a set accelerator and oxidizer. The alum is a coagulant and acts as such in the mix.

Since it is well known that salts in solution in water lower the freezing point, it is clear that the use of any blend of these salts, obviates the necessity of any other addition, such as calcium chloride, when preparing mixtures at freezing temperatures. The various chlorides of the above mentioned metals have qualities suitable for certain finished products; but they add little to the physical properties of the finished products, and, being much more hygroscopic, are not best suited for dry mixing with cement or other desiccating type of filler at packaging points.

By making the additions as above indicated, it is possible to use as an aggregate substantially any material available, as indicated above. For example, in making road pavement, the sand, gravel, dirt and other materials taken from the roadway in leveling may be put into the mixers and used for aggregate. Other materials found adjacent to the roadway may also be used thus reducing the transportation costs.

What I claim is:

1. As a new product for use with Portland cement in the production of concrete, a dry mixture of salts consisting of the following in substantially the proportions stated:

| | Parts by weight |
|---|---|
| Copper sulphate | 11 |
| Ammonium sulphate | 20 |
| Alum | 4 |
| Potassium nitrate | 15 |
| Suitable filler | 60 |

2. As a new product for use with Portland cement in the production of concrete, a dry mixture of salts consisting of the following in substantially the proportions stated:

| | Parts by weight |
|---|---|
| Copper sulphate | 8 to 25 |
| Alum | 3 to 7 |
| Ammonium sulphate | 6 to 20 |
| Potassium nitrate | 10 to 20 |
| Filler | 50 to 70 |

HAROLD M. STARK.